Patented June 14, 1938

2,120,958

UNITED STATES PATENT OFFICE 2,120,958

CATALYST MANUFACTURE

Kenneth W. Coons, Tuscaloosa, Ala., assignor to National Aniline and Chemical Company, Inc., New York, N. Y., a corporation of New York No Drawing. Application February 15, 1936, Serial No. 64,185

2 Claims. (Cl. 23—236)

This invention relates to improvements in the manufacture of active catalysts, and particularly to the commercial manufacture of metallic catalysts.

Metallic hydrogenation catalysts, for example finely divided nickel, cobalt, and the like, have heretofore been prepared by passing a stream of hydrogen or other reducing gas at or above atmospheric pressure and at an elevated temperature, into intimate contact with a salt or oxide of the metal in question, hereinafter referred to as unreduced catalyst.

Although catalysts of high activity have been prepared by such methods on a laboratory scale, for example in quantities of around 10 to 50 grams, catalysts so prepared for commercial use have been found frequently to possess relatively poor activity.

I have now found that nickel hydrogenation catalysts having a superior activity may be manufactured, even on a relatively large scale, by effecting reduction of the unreduced catalyst material at subatmospheric pressure. Furthermore, I have found that the reduction may be effected in less time and with the passage of less reducing gas through the unreduced catalyst material than is the case at atmospheric or superatmospheric pressures.

While it is not desired in any way to limit the invention to a particular theory of reaction, there follows a possible explanation of the use of reduced pressures upon the chemical behavior of the components present during reduction.

In the usual reduction processes at atmospheric or superatmospheric pressures, various gaseous or volatile reaction products which are formed by interaction of a reducing gas or gases with the nickel compound in the catalyst mass, are probably adsorbed by the catalyst mass. Such reaction products exert a deleterious influence on the catalyst, lowering its activity. It may be that the reaction products intervene between the reducing gas stream and the unreduced catalyst material in such a way as to hinder or prevent contact of the reducing gases with the unreduced metal compound and delay or prevent complete reduction of the compound. For example, it has been observed that the presence of water vapor in a stream of reducing gas such as hydrogen, definitely retards reduction of the metal compound in the catalyst mass; similarly the complete reduction of the metal compound is retarded or prevented if the water vapor resulting from the reduction is not removed promptly from the vicinity of the catalyst mass by a stream of reducing gas. It is therefore advantageous to remove the gaseous and/or vaporous products of reaction as quickly and completely as possible from the vicinity of the catalyst mass.

One method of accomplishing this is to increase the linear velocity of the stream of reducing gas thereby to effect a decrease in the concentration of the gaseous products of the reduction. However, at atmospheric and superatmospheric pressures, the upper limit of linear velocity is soon reached; and a stream of reducing gas, as for example, hydrogen, with a sufficiently rapid flow through or along the catalyst mass to accomplish even a reasonably rapid removal of reaction product, tends to sweep away finely divided catalyst particles, and may cause serious losses of catalyst.

By reducing the absolute pressure of the reducing gas stream, higher linear gas velocities may be employed without sweeping away fine catalyst particles. Thus at an absolute pressure around one-sixth atmosphere a linear gas velocity about double the maximum permissible velocity at atmospheric pressure may be employed. On the basis that the capacity of the gas stream for picking up catalyst particles is measured by the kinetic energy of the gas, it may be stated that preferably the subatmospheric pressure and the gas velocity should be coordinated to yield a kinetic energy just below that which would move and carry away catalyst particles.

A most surprising result of my process lies in the fact that a more rapid reduction takes place at reduced pressure than at atmospheric pressure, i. e. the rate of reduction varies inversely to the pressure instead of directly therewith as would be expected. This result may be accounted for by assuming that the reaction produces a gas or vapor film of reaction products on the solid particle surfaces. At ordinary pressure the inertia of this film is high and resists disturbance by the moving gas stream. By reducing the pressure say to one-fifth atmosphere the density of the film is reduced to one-fifth its density at atmospheric pressure. The resistance of the film to disturbance is thus greatly diminished. However, despite the reduced pressure on the system, the kinetic energy of the gas stream may be adjusted, by increasing its velocity, to the same value obtainable at atmospheric pressure. This alteration in the ratio of kinetic energy to film inertia reduces or eliminates the shielding effect as well as any active detrimental effects of the film and in this way increases the speed of reduction and diminishes the time required for the catalyst preparation.

In carrying out the reduction process of the present invention it is preferred to maintain an absolute hydrogen pressure between about 80 mm. of mercury and about 165 mm. of mercury. The reduction temperature may be the same as employed in the prior art reduction processes carried out at or above atmospheric pressure. Thus for reduction of nickel salts, such as NiCO3, temperatures between about 175° C. and about 500° C. may be used. The catalytic material may be treated alone or disposed on a suitable carrier, for example kieselguhr, alundum, asbestos, or a metal support.

The following example illustrates the process of this invention, the parts referred to therein being by weight.

*Example.*—Three parts of finely divided nickel carbonate, supported as a coating on about seven parts of crushed kieselguhr were charged to a reduction vessel. The vessel was evacuated by means of a vacuum pump, and ordinary hydrogen gas, which to distinguish it from activated hydrogen, may be termed "di-atomic hydrogen", was passed into contact with the catalyst at a rate of about .0057 part hydrogen per part catalyst (including kieselguhr) per hour. Meanwhile, the catalyst was heated to a temperature between 300° and 450° C. and thereafter this temperature was maintained until the reduction was complete. During the reduction, the vacuum pump was operated to maintain an absolute pressure of about 115 mm. to about 165 mm. of mercury in the reduction vessel. The passage of hydrogen over the hot catalyst was continued until no more water vapor could be detected in the discharged gases, i. e. about four hours. At the end of this time the catalyst was cooled and the pressure allowed to return to atmospheric by bleeding in dry hydrogen. The catalyst thus prepared was suitable for immediate use. If not used immediately the catalyst may be stored in any suitable medium to prevent reduction of its activity prior to its use.

While the process has been described particularly with respect to a nickel catalyst, it is applicable to the preparation of similar catalyst bodies containing metals other than nickel, for example, cobalt cadmium, copper, zinc, and the like. Further, the improved steps of this invention may be applied with similar benefits in the processes of preparing partially reduced catalysts and it will be understood that this application is intended to comprehend such operations. In place of hydrogen, other suitable reducing gases may be used, for example, carbon-monoxide, ammonia, etc.

The catalyst prepared as outlined in the above example, when employed for hydrogenation of maleic anhydride to succinic anhydride, was found to yield 20% more succinic anhydride per hour than the same amount of catalyst prepared at atmospheric pressure, but otherwise under the same conditions as the catalyst of the example, and employed under like hydrogenation conditions.

I claim:

1. The method of preparing a reduced nickel hydrogenation catalyst, which comprises subjecting a nickel carbonate catalyst body to the action of a stream of di-atomic hydrogen at an absolute pressure substantially below normal atmospheric pressure at a temperature of from about 175° C. to about 500° C.

2. The method of preparing a reduced nickel catalyst, which comprises subjecting finely divided nickel carbonate to the action of a stream of di-atomic hydrogen at a pressure between about 80 mm. and about 165 mm. of mercury and a temperature between about 300° and about 450° C. until evolution of water formed by reduction of said nickel carbonate ceases and coordinating the linear gas velocity and pressure to yield a kinetic energy just below that which causes carrying off of catalyst particles by the gas stream.

KENNETH W. COONS.